United States Patent
Holloway et al.

[11] Patent Number: 5,912,974
[45] Date of Patent: Jun. 15, 1999

[54] APPARATUS AND METHOD FOR AUTHENTICATION OF PRINTED DOCUMENTS

[75] Inventors: Christopher J. Holloway, Woking, United Kingdom; Stephen Michael Matyas, Jr., Poughkeepsie, N.Y.

[73] Assignee: International Business Machines Corporation, Armonk, N.Y.

[21] Appl. No.: 08/846,818

[22] Filed: Apr. 30, 1997

Related U.S. Application Data

[63] Continuation of application No. 08/416,559, Apr. 4, 1995, abandoned.

[30] Foreign Application Priority Data

May 4, 1994 [GB] United Kingdom ............... 9406615

[51] Int. Cl.$^6$ .............. H04K 1/00; G09C 3/08; G09C 3/00; H04L 9/00; H04L 15/34
[52] U.S. Cl. .................. 380/51; 380/23; 380/25; 380/55
[58] Field of Search .................. 380/23, 25, 51

[56] References Cited

U.S. PATENT DOCUMENTS

| | | | |
|---|---|---|---|
| 4,807,287 | 2/1989 | Tucker et al. | 380/23 |
| 4,868,877 | 9/1989 | Fischer | 380/25 |
| 4,908,861 | 3/1990 | Brachtl | 380/25 |
| 4,933,969 | 6/1990 | Marshall et al. | 380/25 |
| 5,005,200 | 4/1991 | Fischer | 380/30 |
| 5,136,646 | 8/1992 | Haber et al. | 380/49 |
| 5,157,726 | 10/1992 | Merkle et al. | 380/23 |
| 5,168,147 | 12/1992 | Bloomberg | 235/456 |
| 5,198,907 | 3/1993 | Walker et al. | 358/296 |
| 5,278,918 | 1/1994 | Bernzott et al. | 382/9 |
| 5,321,749 | 6/1994 | Virga | 380/18 |
| 5,343,527 | 8/1994 | Moore | 380/4 |
| 5,347,579 | 9/1994 | Blandford | 380/25 |
| 5,432,506 | 7/1995 | Chapman | 340/825.34 |
| 5,434,956 | 7/1995 | Son et al. | 395/105 |
| 5,449,895 | 9/1995 | Hecht et al. | 235/494 |
| 5,449,896 | 9/1995 | Hecht et al. | 235/494 |
| 5,453,605 | 9/1995 | Hecht et al. | 235/494 |
| 5,455,941 | 10/1995 | Okuno et al. | 395/600 |
| 5,465,299 | 11/1995 | Matsumoto et al. | 380/23 |
| 5,471,533 | 11/1995 | Wang et al. | 380/51 |
| 5,483,604 | 1/1996 | Salisbury | 382/152 |
| 5,504,818 | 4/1996 | Okano | 380/49 |
| 5,544,045 | 8/1996 | Garland | 364/419.03 |
| 5,581,637 | 12/1996 | Cass et al. | 382/284 |

*Primary Examiner*—Gail O. Hayes
*Assistant Examiner*—Hrayr A. Sayadian
*Attorney, Agent, or Firm*—K. O. Hesse

[57] ABSTRACT

Printed document contents are scanned and digitized, using a conventional scanner, and displayed page by page on a screen. Using a conventional editor and an input device, the scanned and digitized document contents are edited before being used to generate a digital signature. This allows reading errors, which could invalidate a subsequent verification process, to be corrected. Using the editor, and an input device such as a mouse, the signing authority identifies on the screen different segments of the document, each segment containing data of a single type and selects for each segment a set of rules, among a group proposed by the system, for authenticating it. Then, for each segment, an edited digital form of the data contents are derived using the method defined in the rules. A hash value of the rules used and the edited digital form of the segment contents is calculated using a public hashing algorithm. Then the apparatus generates a digital signature of the edited digitized segments contents using the secret key of the authenticator. Finally, an authentication code comprising the edited digital form of each segment and the digital signature is printed on the document. To verify the authenticity, the printed document is scanned and digitized again and the digital signature is checked using the associated public key. If the check fails, the verifier identifies which segment has been scanned differently, comparing it with the related edited digital form in the authentication code printed on the document to evaluate its validity.

60 Claims, 5 Drawing Sheets

APPARATUS AND METHOD FOR AUTHENTICATION OF PRINTED DOCUMENTS

The application is a continuation, of application Ser. No. 08/416,559 filed Apr. 4, 1995, now abandoned.

This invention relates to the use of digital technology for allowing the authentication and verification of printed documents.

Despite the advance in modern computer technology, identification of people and the ownership of property is largely determined by paper documents. Many of these can be traded and themselves represent title in the sense of possession of the document grants title to the property. The documents are often accepted at different places and in different countries to their point of origin. Documents of their very nature get damaged and at some point the damage becomes so great that they can lose all value (e.g. they are destroyed by fire). Following such destruction, a copy of the original may be deemed to be the original, otherwise the copy should be distinguishable.

Traditionally, some authorized person, such as a notary or public officer, performs the authentication of the paper documents utilizing manual tools, such as affixing a signature, or a seal, or by using special paper which makes it more difficult to modify the written contents, e.g. the printing loses its original color. However, with such methods the potential for fraud is considerable, and so the value of a more secure means of authentication is also very great. Techniques used to authenticate documents should be capable of being used in ways that are either intentionally copyable or intended to prevent copying by say photocopier, depending on the nature of the document.

A way of providing authenticated hard copy of a document using digital technology is described in U.S. Pat. No. 5,157,726. This patent describes a dual key or public key cryptosystem for making and authenticating a copy of an original document. In this system a hard copy of the original document is produced to which is added a public key digital signature which represents the document contents and the identity of the entity that supplies such hard copy. This patent also discloses a process for validating the authenticity of the signed hard copy, checking the digital signature and the hard copy document contents and indicating whether the signed copy is valid or invalid. The process for creating a digital signature is well known in the art, and is exemplified in international standards (viz. ISO 9796 and CCITT X509); it comprises processes of data reduction, for example hashing, and of encryption. There are several algorithms known in the art for both hashing and encryption that are suitable for the creation and verification of digital signatures.

However, some difficulties arise since the paper document is very susceptible to modification during its life, due to inkspot, partial erasure, dirt, writing added onto it, and other superficial damage. In such cases the document could still be deemed as valid, but the existing systems are not able to distinguish between such a damaged original document and unauthorized documents. In addition new problems may arise since the reading may not be reproducible. For example coded information, such as English sentences, can be read with reliability because interpretation can be put against each character and because words and sentences contain high degrees of redundancy; whereas it is more difficult against punctuation and spacing. Moreover non-coded information such as pictures and diagrams do not have these properties that permit analysis; similarly such reading is more susceptible to distortion through such superficial damage.

In accordance with the present invention there is now provided apparatus for authentication of a document comprising means for generating and storing the contents of an original document in digital form, means to generate a digital signature from the digital form, and means to attach an authentication code to said original document for subsequent use in demonstrating the authenticity thereof, characterized by means for logically dividing of original document into segments, each segment containing data substantially of a single type, means to generate a digital form of each segment using a digitizing method suitable for the data type contained therein, the contents of each segment being reproducible from the digital form of the segment, and wherein said digital signature is generated from the digital forms of said segments, and said authentication code comprises the digital form of each segment and the digital signature.

This overcomes the problem of the prior art without any reduction of the security of document authenticity. In fact, any alteration of the paper document will modify the document contents which no longer correspond to the generated authentication code stored on it. The encryption of the digital form has the consequence that the code may not be generated by anyone not knowing the secret encryption key chosen; but, if a document fails verification then it is possible to compare the digital form of the original document, attached to the document, with the document itself to better evaluate if the check fails for a damage of the document or something else. In this way it is possible to generate an appropriate digital form for each type of data contained in the document such that the process of validation is improved since the system will be able to determine which segment or segments failed the check. Also this approach prevents compensating changes being made to two or more segments of the same document and obtaining a good overall verification. This attack is of particular concern where one segment may contain encoded information such as a photograph or a diagram which could be almost infinitely varied without noticeable change to the human eye; thus allowing pertinent textual changes to go unnoticed by the verification mechanism. Even so, the mechanism for obtaining a digital form of the content of the document, can be made sufficiently strong to render such attack infeasible.

Moreover, to demonstrate the authenticity of a paper document it is very useful that the authentication code attached is a true representation of its content, but scanners or other reading systems may not be very accurate and in a verification process this wrong representation could be compared with a properly read one.

In a preferred arrangement of the present invention, the apparatus comprises means for displaying each digital form and means enabling the digital form to be edited before said digital form is generated. This allows reading errors, which could invalidate a subsequent verification process to be corrected.

Moreover, the apparatus includes means to generate coordinates for locating each segment with respect to at least two different points on each page of said document, the coordinates being included in the digital form of each segment. This overcomes problems due to small changes in the orientation of the document, between the process of authentication and the process of validation, which will cause such images to be represented very differently in binary form.

Other difficulties arise attaching the verification data to the document. Any authentication information stored upon the document must be stored so as not to be intrusive. It must not interfere with the intended human usage of the document. However, if it is to be copyable it must also be printed in visible form and just finding space to print the information presents some difficulty. If it is not intended that the authentication information is copyable, then an alternative is to print it invisibly making it unintrusive and allowing many areas of the document to be used for storage. Alternatively, the authentication information is stored outside of the document itself. In this case there needs to be a secure means of associating this with the material document.

Thus, the apparatus includes means to identify an area on said document wherein said authentication code may be attached. Preferably, the apparatus comprises means to print said authentication code and said at least two points on said document in a visible or invisible manner. This enables the printed documents to be copyable or not, according to the document requirements.

In a preferred arrangement of the present invention said means to generate a digital form of each segment includes means to generate a reduced form of each digital form, means to concatenate said reduced forms in a set and to reduce said set, and means to encrypt the reduced set and/or the reduced forms. This reduces the risks of compensating changes among the segment of the document, avoiding that the digital form of each segment is modified in accordance to a modification of the segment content on the document.

Preferably, the means to generate a digital form of each segment can comprise means for selecting the digitizing method suitable for the data type contained in the segment. This overcomes the problem of properly digitizing the data contained in the segment, reducing this complex step to a selection among a predefined list of sets of rules. In a particularly preferred arrangement of the present invention the digital signature is generated by a secret key of a public key authentication system. This feature improves the security by allowing a large group of people to verify such coded digital form and therefore verify the authenticity of the document. However only a person or a limited group of people have access to the secret key which may authenticate the document by generating the encrypted form thereof.

Viewing another aspect of the present invention, there is also provided an apparatus for verifying the authenticity of a document provided with an authentication code comprising a first digital form of the document and a digital signature, said apparatus comprising means for generating and storing said document in a second digital form, characterized by means for decrypting said digital signature and storing said first digital form and said decrypted digital signature, said first digital form comprising the digital form of each segment in which the document is logically divided, and means for comparing said decrypted digital signature with said second digital form of said document, and each segment digital form of said first digital form with each segment of the document to verify the authenticity of said document.

An embodiment of the present invention will now be described with reference to the accompanying drawing in which.

Figure 1:
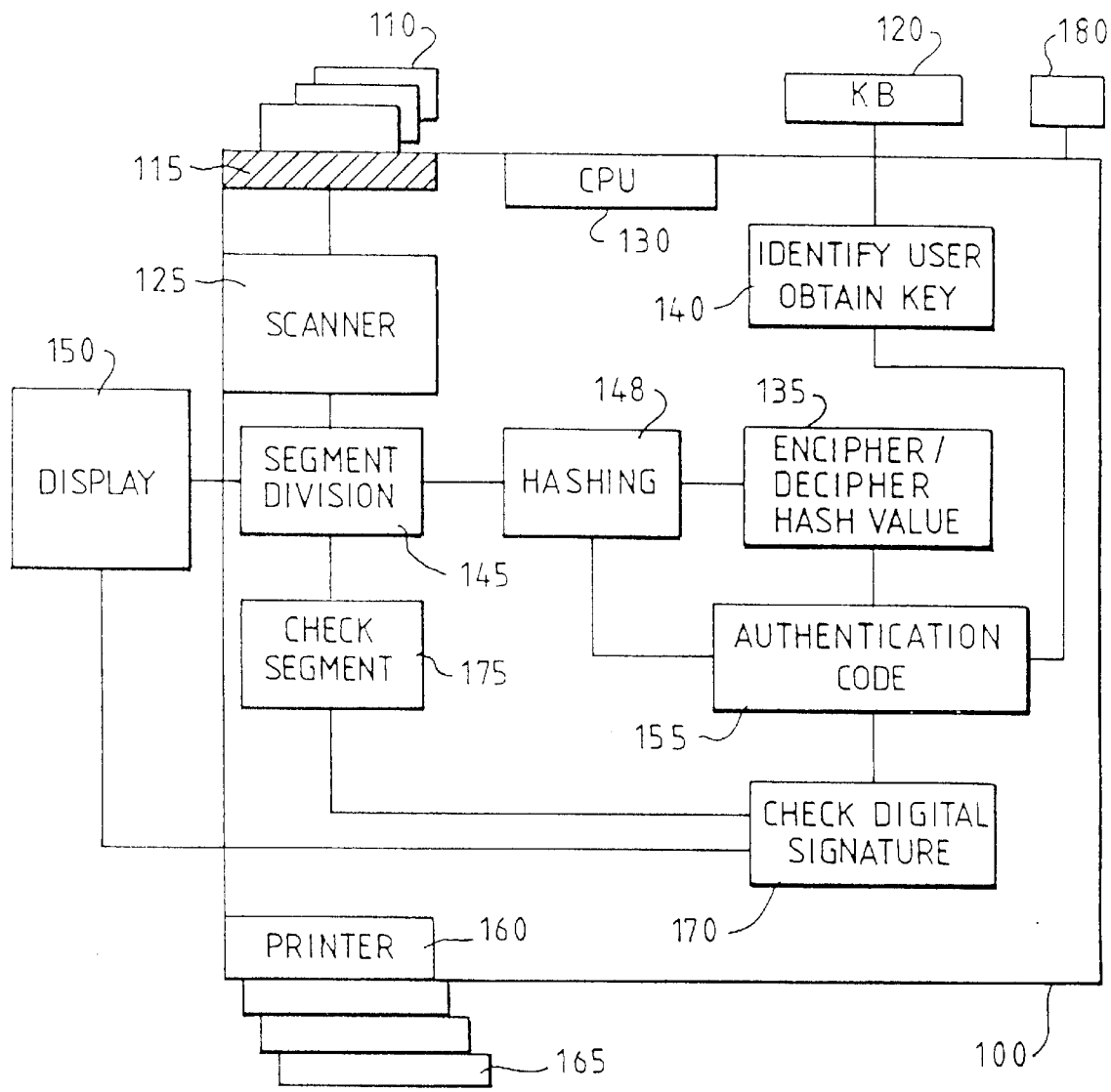
FIG. 1 depicts a block diagram of an apparatus for authentication and verification of an original document.

In a system for authentication and verification of documents the authentication mechanism should be able to verify the integrity of the document contents and to reduce the errors of evaluation. One of the known techniques for assuring integrity of data is through the use of cryptography, as often used for secure electronic transmission of data. One of the most acclaimed schemes uses the dual public/private key system and in this embodiment of the invention such principles are applied to authenticate and verify the document.

In this embodiment, the mechanism of generating and verifying a digital signature is that known in the art. A signing authority possesses a secret key which may be used for encipherment, a verifying authority has access to the corresponding public key which may be used for decipherment. Data is first reduced in a hashing process, using a publicly known hashing algorithm that requires no keys, to produce a hash value. The hash value is enciphered to generate a digital signature of the data. Verification is performed by recreating the same hash value from the original data, and recovering the hash value from decipherment of the signature. If the two hash values match then the data is deemed to be authentic. There are many approaches to controlling the usage of the secret key any of which would be suited to the present disclosure.

The general steps are as follows:

1) The document contents are scanned, digitized, using a conventional scanner, and displayed page by page on a screen.
2) Using a conventional editor and an input device, such as a mouse, the signing authority identifies on the screen different segments of the document containing data of a single type and selects for each segment a set of rules, among a group proposed by the system, for authenticating it.
3) For each segment, a digital form of the data contents are derived using the method defined in the rules. A hash value of the rules used and the digital form of the segment contents is calculated using a public hashing algorithm.
4) A hash value for the document as a whole is obtained by calculating a hash value over the set of hash values for each segment.
5) The system, through a conventional input device, such us a keyboard or a card input device, receives the identification data of the signing authority and his secret signing key.
6) Applying one of many well known signing algorithms to the hash value of the whole document and using the secret signing key, the system generates the digital signature of the document.
7) The system prints the authentication code, containing the digital signature of the document, and the hash value, rules and digital form of each segments contents, on the document.
8) The authenticated document can then be transmitted to a verifying authority who obtains and verifies, or already possesses the public key counterpart to the secret signing key as part of this known public key cryptography scheme. The public key may have been incorporated within the authentication code of the document in the form of a certificate such as defined in international standards (viz. CCITT X509).
9) The document is scanned and digitized again, and for each segment a digital form is recreated and a hash for the segment calculated. The digital signature together with the public checking key are processed via a checking algorithm; this algorithm of which again a number are known, will determine whether or not the hash value of the document underlying the digital signature received corresponds to that obtained from calculating a single hash value across the set of hash values for each segment of the original document.

10) Since for each segment the verifier has access to both the locally calculated digital form and hash value, and to that carried in the authentication code, if the check fails, the user is able to identify which segment(s) have been modified or corrupted, and possibly what those modifications are, so that he will be in a better position for evaluating the validity of the document.

Referring first to FIG. 1, it shows schematically one relatively simple apparatus 100 which has a space 115 for receiving a document 110 which may be an original document or an original authenticated document, a mouse 180 and a keyboard 120 for keying in appropriate commands and/or instructions to the apparatus where necessary, such as the information concerning the secret signing key and other information related to the identity of the user, which are checked in block 140. The apparatus has conventional optical reading means 125, such as a scanner, which preferably is combined to a conventional optical character recognition (OCR) unit which is capable of producing a digital form of the text character information presented on the document. The processing is controlled by a conventional programmable CPU 130, which for simplicity is not shown connected to, for example, keyboard 120 or scanner 125 or other modules employed in apparatus 100. The means to accomplish this would be clear to one skilled in the art. Then an image of the document generated from the digitized information is displayed on a screen 150 for the subsequent division into segments each containing data of a single type in block 145 and for each of the identified segments a method of encoding to create its digital form is selected. Then in block 148 each digitized segment is hashed. According to the digitizing method chosen each hashed segment and/or each digitized segment could be, optionally, signed in block 135. A digital signature is generated for the whole document by signing a hash value calculated over the set of hash values for each segment. Continuing with the description at block 155, the authentication code of the document is built by attaching the digital signature of the document to the hash values and digital forms of each of the segments. The digital signature is generated applying one of many well known public key signing algorithms and the secret signing key. In this case reference is made to the method disclosed in Meyer, Matyas "A new dimension in computer data security—CRYPTOGRAPHY", Wiley Interscience 1982, Chapter 9, particularly pp. 392–396, which is specifically incorporated herein by reference in its entirety. Finally, a printer 160 prints such authentication code on original document 165.

When document 110 is an authenticated document the function of the apparatus 100 is to make sure that the authentication code is valid. To do this, as previously described, the apparatus must obtain a valid copy of the signer's public checking key, which is inserted in the system as described for the secret key, or preferably, it is read by the apparatus if printed on the document during the authentication process. The public key may itself be presented as a certificate which establishes its authenticity. Certification is well known in the art and is described for example in the CCITT X509 and ISO 9796 standards. Such a certificate would be verified by the verifier. In this case scanner 125, capable of reading and digitizing the contents of the document, will read also the authentication code contained in the document. Then a double check is performed. On one hand the digital forms of the segments contained in the authentication code are displayed for the verification process of each segment of the authenticated document at block 175; on the other hand, a hash is calculated for the digital form of each segment and compared with the segment hash included in the authentication code; and a single hash for the whole document is generated, as previously described, and it is compared at block 170 with the decrypted signature of the document, obtained from the digital signature using the public key.

Alternatively two different set of apparatus could be provided, one just for authenticating document and the other for verifying the authenticity of an authenticated document. In such a case, the device which provides the document verification process will have the same facilities as the authentication device, but does not have, or not use, the capability to print or sign.

Figure 2:
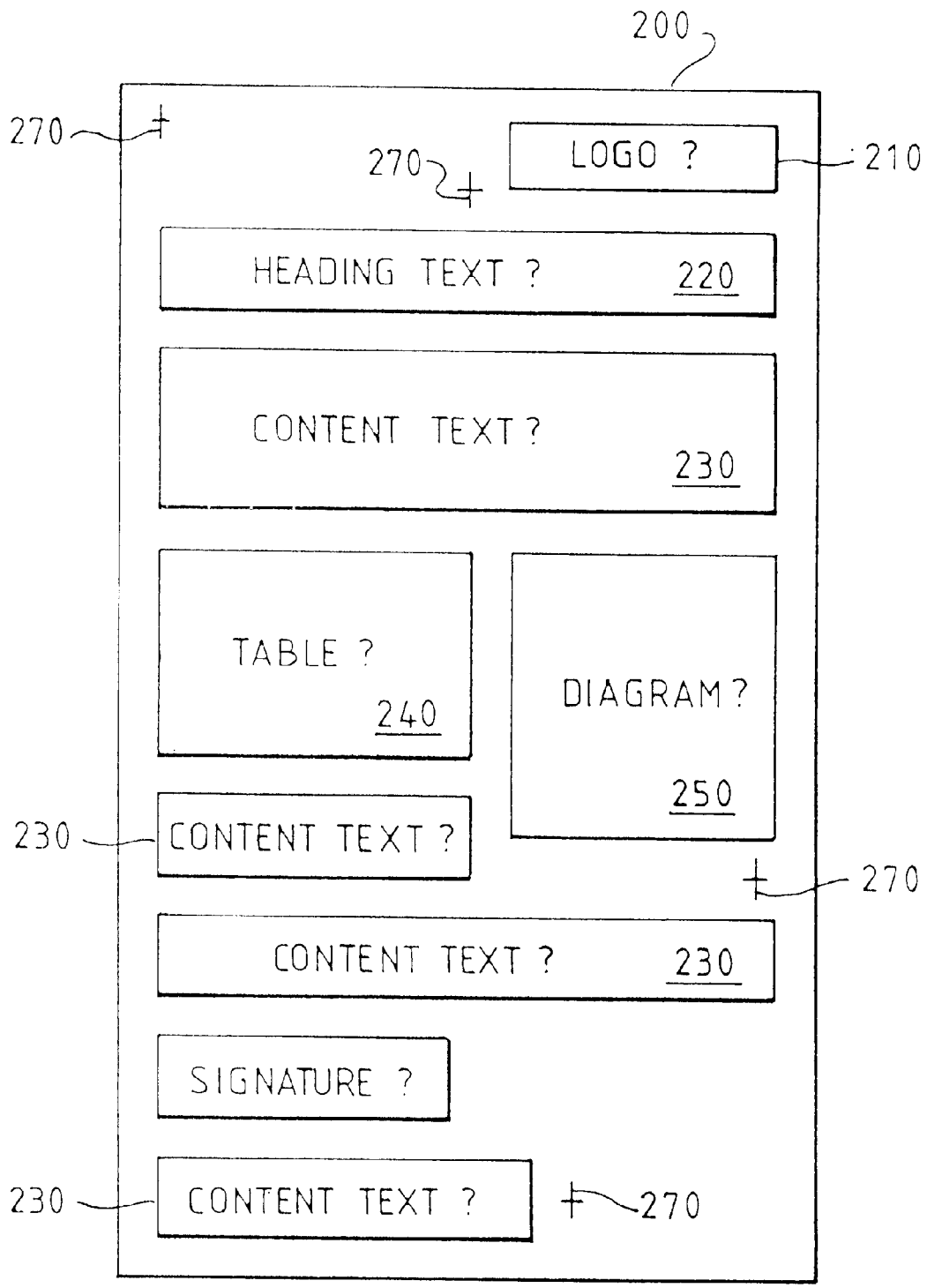
FIG. 2 depicts a segmented page of an original document.

Referring now to FIG. 2 a typical page 200 of a document is shown. It contains many different forms of information: Text 230, a Letter head 220, a Logo 210, a Diagram 250, a Table 240, a Signature 260 and it could contain also pictures and images. In terms of information redundancy, significance, intelligibility, data decoding and repair each of these forms has very different properties and so is handled differently when reading the document. In fact any document can be digitized in any of several known ways. For instance if the document is wholly of text, it can be converted to a stream of ASCII codes and subsequently digitized; whereas reading the text may be insufficient to the process of ensuring authenticity when for example non-standard textual symbols are used, or non-textual, or graphical information is present in the document. In these cases the document can be digitized by known scanning process based on black/white or dark/light transition. Some identifiable points 270 are also inserted in page 200 and they are placed on the document during the process of authentication as described below.

Figure 3:
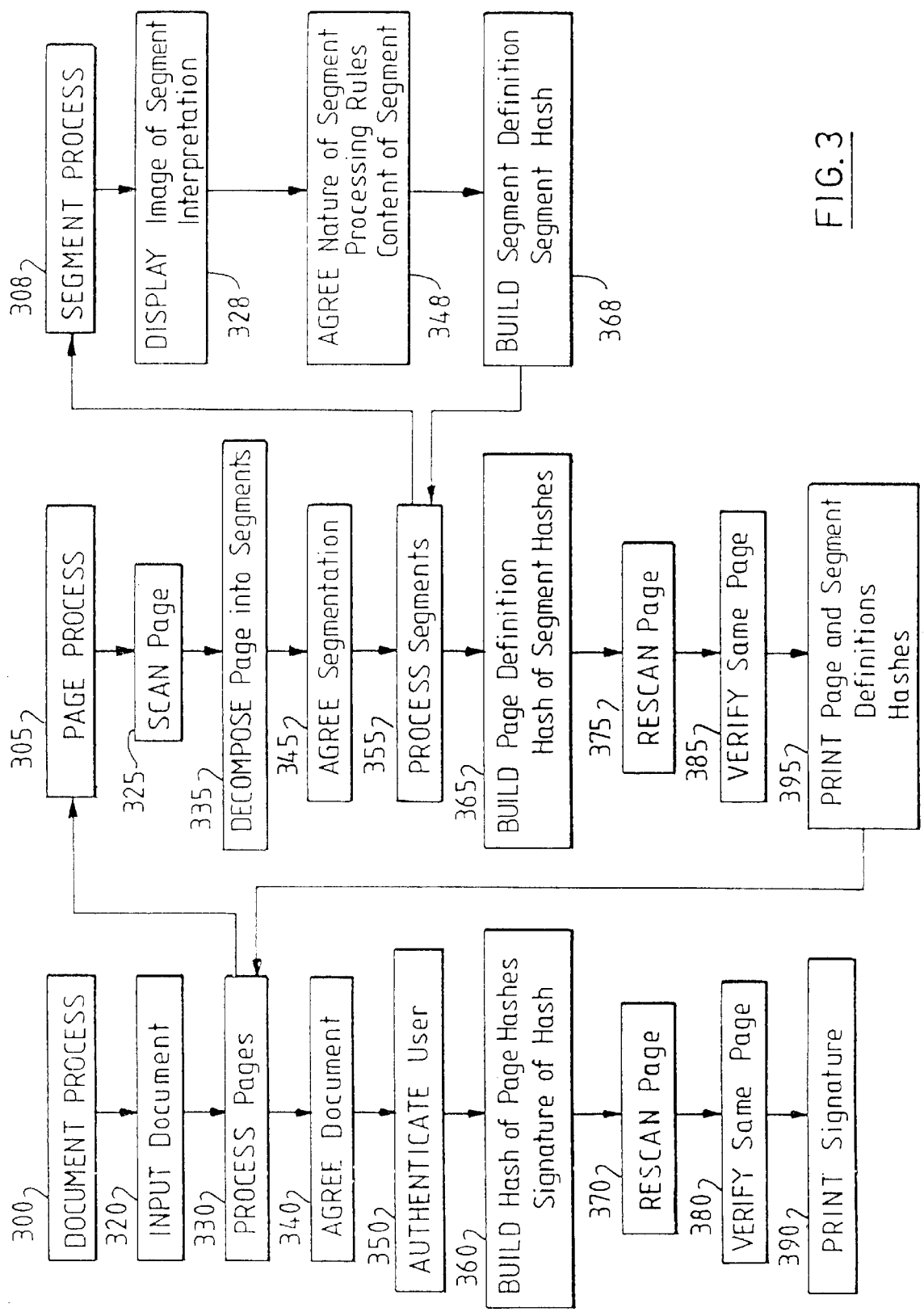
FIG. 3 depicts a block diagram of the authentication process of an original document.

Referring now to FIG. 3, the document authentication process starts at step 300. In step 320 the document is inserted into the system; then, in step 330 all pages of the document are processed and page process 305 is performed for each page.

In step 325 page 200 to be processed is scanned and digitized, using a suitable scanner or an OCR system, for reading the content. Then in step 335 page 200 is subdivided into a set of segments 210, 220, 230, 240, 250, 260 and the coordinates of each segment are recorded and related to at least two defined and identifiable points 270 of the page 200. This allows that each page has a fixed position during the authentication process, avoiding small changes in orientation of the page during the validation process, which may cause the segments to be represented very differently in binary form.

These points 270 are called registration points and are printed on the document when it is first authenticated. Registration points 270 are placed as far apart as possible, but not so close to the edge of the paper as to get lost or damaged. They are also placed so as not to interfere with the other content of the document and for redundancy, it is preferable to have more than two points 270 in case one is lost. In step 345 the authorities system presents page 200 on the screen with suggested placement for registration points 270, if not already present, and suggested segments. An editor is provided, which allows the user to identify on the screen, using a mouse 180 or the keyboard 120 as in a conventional wordprocessor, the different segments of the document. In step 348 the authorizer agrees or modifies the suggested information. Then in step 355 all the segments are processed and for each segment, segment process 308 is performed. Whilst in the present case the definition of the segments is performed. by the user on a displayed image of the document, the possibility that this may be performed automatically via recognition of a particular features of the segment is not excluded.

In step 328 the system displays the proposed system definition 210, 220, 230, 240, 250, or 260 for the segment.

Figure 4:
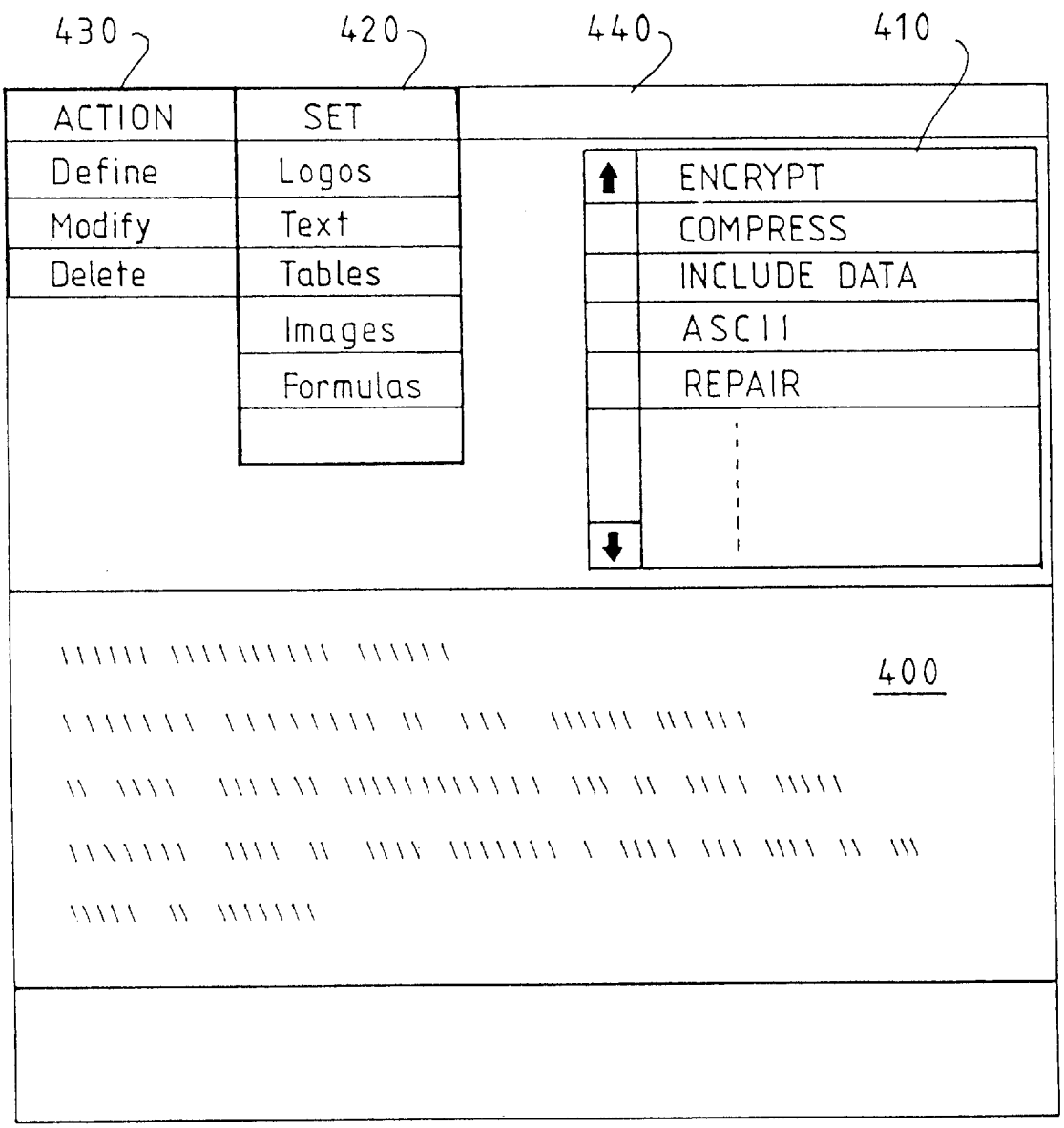
FIG. 4 depicts a process of definition of a segment of the document.

Referring now to FIG. 4, the user selects on the screen from a scroll bar menu 420 of a menu bar 440 the set of authentication rules, which will be applied to each single segment 400, among a group of default type based upon the category of information in the segment which could be changed for each instance. Otherwise, the user may decide to define a new set of rules since for example some paragraphs may be essential to the value of the document and must be strongly authenticated, and others may be allowed to be repaired, or might not need authenticating at all. To do that, the user selects the 'Define' action from the scroll bar menu 430. Then he defines a new name for the new set and he highlights in a table 410, containing all the existing authentication rules, the ones useful for providing his goal. Such highlighted rules will become the new set of authenticated rules identified by the new name. Then the new name is inserted in scroll bar menu 420 for the selection. In the same way it is possible to update an existing set of rules. For example, if the user wants to modify the set named 'Formula', he has to select 'Modify' on the scroll bar menu 430, then he selects 'Formula' from the scroll bar menu 420 and at the end he highlights new rules or unhighlights any of the old one. With the option 'Delet' of the scroll bar menu 430, it is possible to delete one of the defined set, selecting it in the scroll bar menu 420. However, the set of authentication rules from which to choose must be common to the scheme as a whole, and the selected rule for each segment must be clear to the verifier, and could be defined within the segment definition of each segment. A list of the default authentication rules for the different types of segment is now provided:

Logos The authorizer types the name of the company whose logo is on the document. This information is included in the segment definition and is presented for verification when the document is to be checked.

Text The system decodes the text into ASCII, including capitalization, punctation and spaces. However, a series of spaces is reproduced to a single space; and line feeds are ignored. The coded form should be displayed to the authorizer along with the image of the same text from the document so that the user may verify the text. Any identified spelling or context error in the decoded data is highlighted as these may represent decoding errors. The user then repairs the decoded data so as to be a true representation of the document content. The repaired data is authenticated.

Tables Vertical and horizontal division lines are removed by the imaging system under the control of the user. The coordinates of all removed lines are recorded in the segment definition. The data content of the table is treated as text.

Images This data includes also Pictures, Diagrams and Signatures. It is the most difficult as it often cannot be reliably coded. An image is taken of the segment to a particular imaging standard that is defined in the segment definition. If the image is to be authenticated, as in the case of a person's photograph or signature, then the image is compressed an compressed form stored within the segment definition, then the compressed form is authenticated. For a verification of an image, two options exist:

either the decompressed form is displayed along the scanned segment. These are compared and any differences are highlighted. The user checking the document can then make an assessment of the significance of any differences;

alternatively, a statistical form of validation can be performed using techniques applied to biometric identification, yielding a probability that this is the original image.

In both cases the authenticator verifies the reference pattern used in the comparison.

Referring back to FIG. 3, in step 348, the authorizer accepts the presented segment definition and authentication rules or modifies them. Thus, the content of the segment is encoded using the authentication rules. Now, the process moves to step 368, where the coordinates, rules and digital form of the segment are hashed to give a hash value for the segment; the hash value, the coordinates, the authentication rules of the segment and the digital form are included in the segment definition.

Now, the control is transferred again to step 355, which checks if other segments of the page are still waiting to be processed; if not, in step 365 the page definition is built and hashed. Therefore the page as a whole is reduced by taking the hash values of the segments and of the page in turn and creating a hash of the concatenated set.

Clearly the above steps would not be necessary for each instance, or segment, of a defined document type such as a passport, but would be defined once and incorporated within the authentication system of the issuing authorities However the definition would be made available to any verifying authorities, and this could be done, as further described, by carrying the information on each document of that type, or defining the verification system independently.

After the completion of step 365 the control passes to step 375, wherein the page is scanned again, unless it is still held securely within the apparatus, and in step 385 the suggested placements for the segment definition and the hash values are verified to be available. Thus in step 395 the page and the segments definitions and the page hash value are printed on the same page or, when identified, in the additional papers or stored in the associate storage means. It will be understood that any available method for encoding digital data on paper may be used. An example of such a technique is described in UK patent application no. 2,218,240A, which is specifically incorporated herein by reference in its entirety.

The control is now returned to step 330, which checks if other pages of the document are still to be processed; if not, in step 340 the signing authority agrees to the document definitions, as built during the process, and in step 350 he provides to the system his secret key of a dual key security scheme for a validity check. If the key is still valid the signing authority is authorized to sign the document, thus, in step 360, the document as a whole is authenticated by taking the hash value of each page in turn and creating a hash of the new concatenated set, finally this document wide hash is signed by the signing authority, using his secret key. In step 370 the page of the document which contains the suggested placement for printing the digital signature is scanned again, unless it is still held securely within the apparatus, and in step 380 said suggested placement is verified to be available.

The authorization process ends in step 390, printing the digital signature on the document.

Those skilled in the art will appreciate that the stream of digital information representing the document contents can be simply subjected to a checksum or similar algorithm or function whose output would then represent the actual full contents of the document, instead of hashing as described above, but that this would provide less protection against intentional modification. Similarly, all the digital information can be digitally signed before attaching it on the paper to increase the security of the document. Moreover, the digital information may be attached to the document in any of several known ways such as printing or sticking.

In this example the digital signature is attached to the document by being printed in a visible manner on the document itself using a suitable method for encoding digital data on paper. However it will be appreciated that the signature could be printed invisibly, which prevents the digital signature from being photocopied; or could be printed on a separate piece of paper or stored in other storage means which is secured to the document. In the case of invisible printing the scanning equipment will scan both the visible and the invisible content, and it will present the two sets of information preferably in different positions, or displaying them using different styles of the font or colors, so that the verifying user can associate them easily without one set interfering with the other. For verification of the hash values, the signature, and the segment definitions, which include segment contents, authentication rules and coordinates of the segment, representing the authentication code of the document, must all be retrieved from the document itself or an associated storage medium. This data is subject to the same reliability difficulties as the document content. However, each discrete set of information can be protected against accidental damage by the inclusion of simple check codes (e.g. CRC) or sophisticated error detection and repair codes of known type; and in verification process, authentication data too should be allowed to be repaired by the authorized user so that document validation may proceed.

Figure 5:
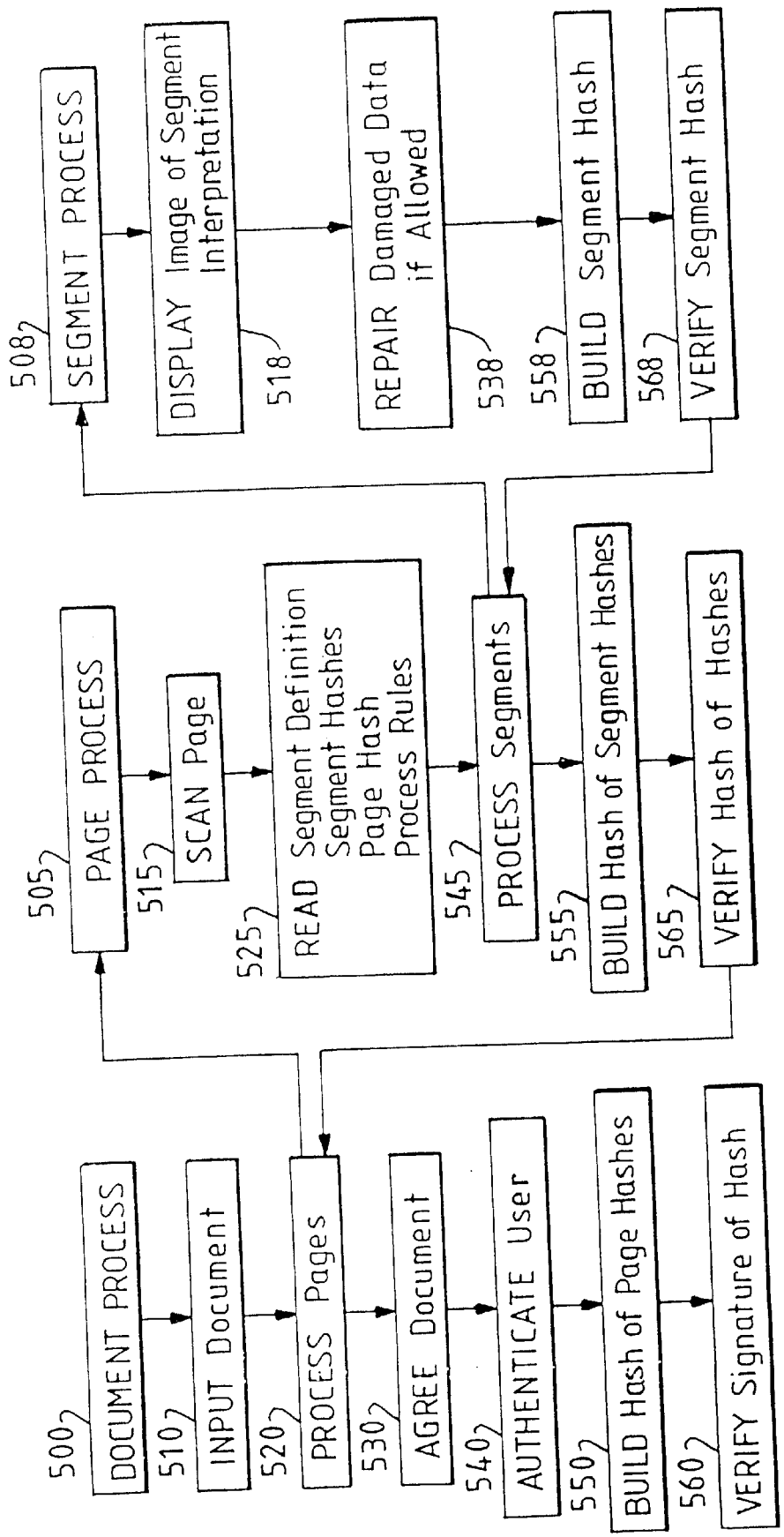
FIG. 5 depicts a block diagram of the verification process of an authenticated original document.

Referring now to FIG. 5, the verification process starts at step 500. In step 510 the document is inserted into the system; then, in step 520 all pages of the document are processed and for each page, page process 505 is performed. In step 515 page 200 to be processed is scanned, for reading all the content, visible or invisible. In step 525 the authentication code stored into the document is read and the page hash and the segment and page definitions are identified, for allowing the complete process of the page. In step 545 all the segment definitions of the page are processed and for each of them segment process 508 is performed.

In step 518 the image of the encoded content of the segment, contained in the segment definition, is rebuilt and displayed on the screen, and in the meantime, reading the segment coordinates and the segment authentication rules contained in the same segment definition, also the actual content of the segment is displayed on the screen. Those skilled in the art may appreciate that the two images may be overlapped for a better evaluation of the differences, or the system itself may highlight such differences. In step 538 the contents of both the representations may be edited to improve the verification process, allowing the verifier to repair the data damaged or wrongly read in one of the two representations, based on the data contained in the other representation. Clearly this step could be prevented, or limited, for some kinds of document or data. In step 558 the actual content of the segment, repaired or not, is hashed, as already described in step 368, and in step 568 this derived hash is compared with the hash code of the corresponding segment registered on the document. If part of the authentication code is damaged, and if the verifying user is permitted to repair it, then the repaired authentication code is substituted for the changed one only during this verification process. For security reasons, the verifying user is not provided with any capability to update the authentication code stored on the document. Obviously, depending on the kind of the damage, part of the authentication process should be carried out again to produce the repaired authentication code. However, it is never permissible to repair the digital signature of the document as a whole.

At the end of step 568, the control is returned to step 545, which checks if other segments are still to be processed; if not, in step 555 the actual content of the page is hashed, as explained in step 365, and in step 565 the resulting hash code is compared with the hash code of the correspondent page registered on the document, repair to the page hash being allowed in the same way as repair to the individual segment hashes. The control is now returned to step 520 which checks if other pages are still to be processed, if not in step 530, the verifier accepts the content of the document as read, and repaired, by the system. Then in step 540 the verifying user inserts the public key certificate corresponding to the secret key used for authenticating the document. This is verified in step 550 the accepted content of the document is hashed, as explained in step 360. The process ends in step 560, wherein the document hash obtained from the digital signature is compared with the hash produced by verifying the document. If both are equal then the document is accepted.

As mentioned previously, there are many ways by which the various functions described above can be implemented, and the invention is not limited to the specific means by which the digitalization, optical reading, comparison system and other authenticating and verifying features are implemented.

We claim:

1. Apparatus for authenticating a hardcopy document comprising:

means for digitizing information content of a hardcopy document;

means for editing a digital form of the information content of the hardcopy document, means for creating an edited digital form of the information content of the hardcopy document, which creating means comprises means for producing, from the same hardcopy document, a second digital form substantially equivalent to the edited digital form;

means for encrypting the edited digital form to generate a digital signature;

means for generating an authentication code from the edited digital form and the digital signature;

means for attaching the authentication code to the hardcopy document; and means for verifying the authenticity of the hardcopy document using the authentication code.

2. Apparatus as claimed in claim 1, further comprising means for identifying an area on the hardcopy document where the authentication code may be attached.

3. Apparatus as claimed in claim 2, further comprising means for printing the authentication code on the hardcopy document.

4. Apparatus as claimed in claim 1, wherein the means for editing further comprises:

means for logically dividing the digital form into segments, each segment containing information substantially of a single data type;

means for generating, in the edited digital form, data of a segment using a digitizing method suitable for the data type contained in the segment, information content of the segment being reproducible from the edited digital form.

5. Apparatus as claimed in claim 4, further comprising means for generating coordinates for locating each segment with respect to at least two different registration points on each page of said document, wherein the coordinates are included in the edited digital form of each segment.

6. Apparatus as claimed in claim 4, wherein the means for logically dividing further comprises:

means for displaying the digital form; and means for receiving input from a signing authority identifying a segment of the information content containing data of a single type, and selecting for the segment, a set of rules, from among a group of rules, for authenticating the segment.

7. Apparatus as claimed in claim 6, further comprising:

means for suggesting to the signing authority, a suggested segment, and a suggested placement of registration points on the hardcopy document, from which points, coordinates of the segment may be determined.

8. Apparatus as claimed in claim 7, further comprising:

means for printing the registration points on the hardcopy document.

9. Apparatus as claimed in claim 6, wherein said means for suggesting further comprises:

means for suggesting a digitizing method suitable for the data type in the suggested segment.

10. Apparatus as claimed in claim 6, wherein the means for receiving input from the signing authority includes receiving input selecting a rule allowing repair of the edited digital form portion of the authentication code during verification of the hardcopy document.

11. Apparatus as claimed in claim 4, wherein the means for editing the digital form further comprises:

means for selecting a plurality of segments;

means for reducing each digital form of each segment;

means for concatenating the reduced digital forms of the segments; and means for reducing the concatenated reduced digital forms of the segments to provide the edited digital form.

12. Apparatus as claimed in claim 1, wherein the means for encrypting the edited digital form to generate a digital signature further comprises:

means for generating the digital signature using a secret key of a dual key pair.

13. Apparatus as claimed in claim 1, further comprising:

means for reading the authentication code including the digital signature and the edited digital form of a presented authenticated hardcopy document;

means for decrypting said digital signature and storing the edited digital form and the decrypted digital signature;

means for generating and storing, in a presented digital form, digitized information content of the presented hardcopy document;

means controlled by a segment definition in the authentication code for logically dividing from the presented digital form, a segment containing information substantially of a single data type;

means for generating, in a segment digital form, digitized information content of the segment using a digitizing method specified by the authentication code; and means for comparing the decrypted digital signature with the segment digital form to verify the authenticity of said document.

14. Apparatus for verifying the authenticity of a presented hardcopy document provided with an authentication code, the authentication code including an edited digital form and a digital signature, the edited digital form comprising a digital form of a segment of the document, the apparatus comprising:

means for reading from a hardcopy document the authentication code, which means for reading includes means for reading the digital signature and the edited digital form of the document; means for decrypting said digital signature and storing the edited digital form and the decrypted digital signature;

means for digitizing information content of the presented hardcopy document;

means for generating and storing, in a presented digital form, digitized information content of the presented hardcopy document;

means controlled by a segment definition in the authentication code for logically dividing from the presented digital form, a segment containing information substantially of a single data type;

means for generating, in a second digital form, digitized information content of the segment using a digitizing method suitable for the data type contained in the segment; and means for verifying the authenticity of the hardcopy document by comparing the decrypted digital signature with the second digital form.

15. Apparatus as claimed in claim 14, wherein the digitizing method suitable for the data type contained in the segment is specified in the authentication code.

16. Apparatus as claimed in claim 14, further comprising:

means for displaying the second digital form and the edited digital form;

means for highlighting on the display, differences between the second digital form and the edited digital form;

means for receiving input for correcting digitizing errors causing the differences, to improve the ability to verify the authenticity of the authenticated document.

17. Apparatus as claimed in claim 14, further comprising:

means for displaying the presented digital form; and means for receiving input correcting damaged information content in the presented digital form of the presented hardcopy document to improve ability to verify authenticity of the authenticated document.

18. Apparatus as claimed in claim 14, wherein the presented hardcopy document comprises a plurality of segments and the edited digital form comprises an edited segment digital form of information of each of the plurality of segments of the authenticated document, the means controlled by a segment definition in the authentication code for logically dividing from the presented digital form, a segment containing information substantially of a single data type further comprising:

means for comparing each segment digital form divided from the presented digital form with a corresponding edited segment digital form of each segment of the authenticated document.

19. Apparatus as claimed in claim 18 wherein the means for generating further comprises:

means for reducing a segment digital form of each segment to obtain a reduced segment digital form for each segment;

means for concatenating the reduced segment digital forms of the segments; and means for reducing the concatenated reduced digital forms of the segments to provide the second digital form.

20. Apparatus as claimed in claim 14 wherein the means for comparing further comprises:

means for statistically comparing the decrypted digital signature with the second digital form in order to statistically verify the authenticity of the authenticated document.

21. Method of authenticating a hardcopy document comprising:

digitizing information content of a hardcopy document to generate a digital form of the information content of the hardcopy document;

editing said digital form of the information content of the hardcopy document, creating an edited digital form; producing from the same hardcopy document, an improved second digital form substantially equivalent to the edited digital form;

encrypting the edited digital form to generate a digital signature;

generating an authentication code from the edited digital form and the digital signature;

attaching the authentication code to the hardcopy document, and verifying the authenticity of the hardcopy document.

22. Method of claim 21, further comprising:

identifying an area on the hardcopy document where the authentication code may be attached.

23. Method of claim 22, further comprising:

printing the authentication code on the hardcopy document.

24. Method of claim 21, wherein the editing further comprises:

logically dividing the digital form into segments, each segment containing information substantially of a single data type;

generating, in the edited digital form, data of a segment using a digitizing method suitable for the data type contained in the segment, the information content of the segment being reproducible from the edited digital form.

25. Method of claim 24, further comprising generating coordinates for locating each segment with respect to at least two different registration points on each page of said document, wherein the coordinates are included in the segment digital form of each segment.

26. Method of claim 24, wherein the logically dividing further comprises:

displaying the digital form; and receiving input from a signing authority identifying a segment of the information content containing data of a single type, and selecting for the segment, a set of rules, from among a group of rules, for authenticating the segment.

27. Method of claim 26 further comprising:

suggesting to the signing authority, a suggested segment, and a suggested placement of registration points on the hardcopy document, from which points, coordinates of the segment may be determined.

28. Method of claim 27 further comprising:

printing the registration points on the hardcopy document.

29. Method of claim 26, wherein said suggesting further comprises:

suggesting a digitizing method suitable for the data type in the suggested segment.

30. Method of claim 26 wherein the receiving input from the signing authority includes receiving input selecting a rule allowing repair of the edited digital form portion of the authentication code during verification of the hardcopy document.

31. Method of claim 24 wherein the editing the digital form further comprises:

selecting a plurality of segments;

reducing each digital form of each segment;

concatenating the reduced digital forms of the segments; and reducing the concatenated reduced digital forms of the segments to provide the edited digital form.

32. Method of claim 21 wherein the encrypting the edited digital form to generate a digital signature further comprises:

generating the digital signature using a secret key of a dual key pair.

33. Method of claim 21 further comprising:

reading the authentication code including the digital signature and the edited digital form of a presented authenticated hardcopy document;

decrypting said digital signature and storing the edited digital form and the decrypted digital signature;

generating and storing, in a presented digital form, digitized information content of the presented hardcopy document;

means controlled by a segment definition in the authentication code for logically dividing from the presented digital form, a segment containing information substantially of a single data type;

generating, in a segment digital form, digitized information content of the segment using a digitizing method specified by the authentication code; and comparing the decrypted digital signature with the segment digital form to verify the authenticity of said document.

34. Method of verifying the authenticity of a presented hardcopy document provided with an authentication code, the authentication code including an edited digital form and a digital signature, the edited digital form comprising a digital form of a segment of the document, the method comprising:

reading the authentication code including the digital signature and the edited digital form of the document; decrypting said digital signature and storing the edited digital form and the decrypted digital signature;

digitizing information content of the presented hardcopy document;

generating and storing, in a presented digital form, digitized information content of the presented hardcopy document;

logically dividing from the presented digital form, a segment containing information substantially of a single data type;

generating, in a segment digital form, data of the segment using a digitizing method corresponding to the data type contained in the segment; and verifying the authenticity of said hardcopy document by comparing the decrypted digital signature with the segment digital form.

35. Method of claim 34, wherein the digitizing method suitable for the data type contained in the segment is specified in the authentication code.

36. Method of claim 34, further comprising:

displaying the second digital form and the edited digital form;

highlighting on a display, differences between the second digital form and the edited digital form;

receiving input for correcting digitizing errors causing the differences, to improve the ability to verify the authenticity of the authenticated document.

37. Method of claim 34, further comprising:

displaying the presented digital form; and receiving input for correction of damaged information content in the presented digital form of the presented hardcopy document to improve ability to verify authenticity of the authenticated document.

38. Method of claim 34, wherein the presented hardcopy document comprises a plurality of segments and the edited digital form comprises an edited segment digital form of information of each of the plurality of segments of the authenticated document, the act of dividing divides the plurality of segments from the presented digital form into a plurality of segment digital forms, the method further comprising:

comparing each segment digital form divided from the presented digital form with a corresponding edited segment digital form of each segment of the authenticated document.

39. Method of claim 38 wherein the act of generating further comprises:

reducing a segment digital form of each segment to obtain a reduced segment digital form for each segment;

concatenating the reduced segment digital forms of the segments; and reducing the concatenated reduced digital forms of the segments to provide the second digital form.

40. Method of claim 34, wherein the act of comparing further comprises:

statistically comparing the decrypted digital signature with the second digital form in order to statistically verify the authenticity of the authenticated document.

41. A computer program product having a computer readable medium having computer program logic recorded thereon for authentication of a hardcopy document, comprising:

means for digitizing information content of a hardcopy document;

means for editing a digital form of the information content of the hardcopy document; means for creating a second digital form, wherein the output of the editing means is substantially equivalent to the output of the means for creating a second digital form;

generating a digital signature by encrypting the edited digital form;

means for generating an authentication code from the edited digital form and the digital signature;

means for controlling attachment of the authentication code to the hardcopy document; and means for demonstrating the authenticity of the hardcopy document using the attached authentication code.

42. A computer program product of claim 41, further comprising means for printing the authentication code on the hardcopy document.

43. A computer program product of claim 41, further comprising means for identifying an area on the hardcopy document where the authentication code may be attached.

44. A computer program product of claim 41, wherein the means for editing further comprises:

means for logically dividing the digital form into segments, each segment containing information substantially of a single data type;

means for generating into the edited digital form, data of a segment using a digitizing method suitable for the data type contained in the segment, the information content of the segment being reproducible from the edited digital form.

45. A computer program product of claim 44, further comprising means for generating coordinates for locating each segment with respect to at least two different registration points on each page of said document, wherein the coordinates are included in the edited digital form of each segment.

46. A computer program product of claim 44, wherein the means for logically dividing further comprises:

means for displaying the digital form; and means for receiving input from a signing authority identifying a segment of the information content containing data of a single type, and selecting for the segment, a set of rules, from among a group of rules, for authenticating the segment.

47. A computer program product of claim 46, further comprising:

means for suggesting to the signing authority, a suggested segment, and a suggested placement of registration points on the hardcopy document, from which points, coordinates of the segment may be determined.

48. A computer program product of claim 47, further comprising:

means for printing the registration points on the hardcopy document.

49. A computer program product of claim 46, wherein said means for suggesting further comprises:

means for suggesting a digitizing method suitable for the data type in the suggested segment.

50. A computer program product of claim 46, wherein the means for receiving input from the signing authority includes receiving input selecting a rule allowing repair of the edited digital form portion of the authentication code during verification of the hardcopy document.

51. A computer program product of claim 44, wherein the means for editing the digital form further comprises:

means for selecting a plurality of segments;

means for reducing each digital form of each segment;

means for concatenating the reduced digital forms of the segments; and means for reducing the concatenated reduced digital forms of the segments to provide the edited digital form.

52. A computer program product of claim 41, wherein the means for encrypting the edited digital form to generate a digital signature further comprises:

means for generating the digital signature using a secret key of a dual key pair.

53. A computer program product of claim 41, further comprising:

means for reading the authentication code including the digital signature and the edited digital form of a presented authenticated hardcopy document;

means for decrypting said digital signature and storing the edited digital form and the decrypted digital signature;

means for generating and storing, in a presented digital form, digitized information content of the presented hardcopy document;

means controlled by a segment definition in the authentication code for logically dividing from the presented digital form, a segment containing information substantially of a single data type;

means for generating, in a segment digital form, digitized information content of the segment using a digitizing method specified by the authentication code; and means for comparing the decrypted digital signature with the segment digital form to verify the authenticity of said document.

54. A computer program product having a computer readable medium having computer program logic recorded thereon for verifying the authenticity of a presented hardcopy document provided with an authentication code, the authentication code including an edited digital form and a digital signature, the edited digital form comprising a digital form of a segment of the document, the program product comprising:

means for reading from the hardcopy document the authentication code, which reading means includes means for reading the digital signature and the edited digital form of the document; means for decrypting said digital signature to obtain a decrypted digital signature;

means for digitizing information content of the presented hardcopy document;

means for generating into a presented digital form, digitized information content of the presented hardcopy document;

means controlled by data in the authentication code for logically dividing from the presented digital form, a segment containing information substantially of a single data type;

means for generating, in a second digital form, data of the segment using a digitizing method specified by the authentication code; and means for verifying the authenticity of said hardcopy document by comparing the decrypted digital signature with the second digital form.

55. Computer program product of claim 54, wherein the digitizing method suitable for the data type contained in the segment is specified in the authentication code.

56. Computer program product of claim 54, further comprising:

means for displaying the second digital form and the edited digital form;

means for highlighting on a display, differences between the second digital form and the edited digital form;

means for receiving input for correcting digitizing errors causing the differences, to improve the ability to verify the authenticity of the authenticated document.

57. Computer program product of claim 54, further comprising:

means for displaying the presented digital form; and means for receiving input correcting damaged information content in the presented digital form of the presented hardcopy document to improve ability to verify authenticity of the authenticated document.

58. Computer program product of claim 54, wherein the presented hardcopy document comprises a plurality of segments and the edited digital form comprises an edited segment digital form of information of each of the plurality of segments of the authenticated document, the means controlled by data in the authentication code for logically dividing from the presented digital form, a segment containing information substantially of a single data type further comprising:

means for comparing each segment digital form divided from the presented digital form with a corresponding edited segment digital form of each segment of the authenticated document.

59. Computer program product of claim 58 wherein the means for generating further comprises:

means for reducing a segment digital form of each segment to obtain a reduced segment digital form for each segment;

means for concatenating the reduced segment digital forms of the segments; and means for reducing the concatenated reduced digital forms of the segments to provide the second digital form.

60. Computer program product of claim 54, wherein the means for comparing further comprises:

means for statistically comparing the decrypted digital signature with the second digital form in order to statistically verify the authenticity of the authenticated document.

* * * * *